United States Patent
Noguchi et al.

(10) Patent No.: US 8,853,292 B2
(45) Date of Patent: Oct. 7, 2014

(54) ACTIVE RAY CURABLE COMPOSITION, ACTIVE RAY CURABLE INK COMPOSITION FOR INKJET PRINTING, ACTIVE RAY CURABLE ADHESIVE COMPOSITION, AND METHOD FOR STABILIZING ACTIVE RAY CURABLE COMPOSITION

(71) Applicants: Soh Noguchi, Kanagawa (JP); Okitoshi Kimura, Kanagawa (JP); Koji Arimitsu, Tokyo (JP)

(72) Inventors: Soh Noguchi, Kanagawa (JP); Okitoshi Kimura, Kanagawa (JP); Koji Arimitsu, Tokyo (JP)

(73) Assignees: Ricoh Company, Ltd., Tokyo (JP); Tokyo University of Science Foundation, Tokyo (JP)

( * ) Notice: Subject to any disclaimer, the term of this patent is extended or adjusted under 35 U.S.C. 154(b) by 0 days.

(21) Appl. No.: 13/847,617

(22) Filed: Mar. 20, 2013

(65) Prior Publication Data

US 2013/0267625 A1     Oct. 10, 2013

(30) Foreign Application Priority Data

Apr. 5, 2012   (JP) .................................. 2012-086047

(51) Int. Cl.
| | | |
|---|---|---|
| *G03G 9/097* | (2006.01) | |
| *B41M 7/00* | (2006.01) | |
| *B29C 71/04* | (2006.01) | |
| *A61L 2/08* | (2006.01) | |
| *A61L 24/00* | (2006.01) | |
| *C08F 2/46* | (2006.01) | |
| *C08G 61/04* | (2006.01) | |
| *C09J 4/00* | (2006.01) | |
| *C09D 11/101* | (2014.01) | |
| *C09D 4/00* | (2006.01) | |

(52) U.S. Cl.
CPC ... *C09D 4/00* (2013.01); *C09J 4/00* (2013.01); *C09D 11/101* (2013.01)
USPC ................ 522/75; 522/74; 522/71; 522/189; 522/184; 522/1; 520/1

(58) Field of Classification Search
USPC ................ 522/75, 74, 71, 189, 184, 1; 520/1
See application file for complete search history.

(56) References Cited

U.S. PATENT DOCUMENTS

| | | |
|---|---|---|
| 6,512,023 B1 | 1/2003 | Malofsky et al. |
| 6,642,337 B1 | 11/2003 | Misiak et al. |
| 2005/0148687 A1 | 7/2005 | Sasa |
| 2011/0014096 A1 | 1/2011 | Fukuoka et al. |
| 2011/0060100 A1 | 3/2011 | Kimura et al. |
| 2011/0097669 A1* | 4/2011 | Fukui et al. ................ 430/281.1 |
| 2012/0086762 A1 | 4/2012 | Noguchi et al. |
| 2012/0142806 A1 | 6/2012 | Motofuji et al. |
| 2012/0147103 A1 | 6/2012 | Hasegawa et al. |
| 2012/0176456 A1 | 7/2012 | Maekawa et al. |
| 2012/0242768 A1 | 9/2012 | Seno et al. |
| 2012/0283378 A1 | 11/2012 | Shoshi et al. |
| 2013/0005849 A1 | 1/2013 | Noguchi et al. |
| 2013/0065024 A1 | 3/2013 | Aruga et al. |

FOREIGN PATENT DOCUMENTS

| | | |
|---|---|---|
| JP | 2001-302881 | 10/2001 |
| JP | 3299513 | 4/2002 |
| JP | 2002-285107 | 10/2002 |
| JP | 2005-060520 | 3/2005 |
| JP | 2005-194357 | 7/2005 |
| JP | 2007-101685 | * 4/2007 |
| JP | 4208414 | 10/2008 |
| JP | 2009-244745 | 10/2009 |
| JP | 2009/019979 | * 12/2009 |
| JP | 2009-280785 | * 12/2009 |
| JP | 2010-084144 | 4/2010 |
| JP | 2010-089259 | 4/2010 |
| JP | 2010-222586 | 10/2010 |
| JP | 2011-080032 | 4/2011 |
| JP | 4830435 | 9/2011 |
| JP | 2011-202160 | 10/2011 |
| JP | 2011-213783 | 10/2011 |
| JP | 2011-221476 | 11/2011 |
| WO | WO 01/79374 A2 | 10/2001 |
| WO | WO 2009/019979 A1 | 2/2009 |

\* cited by examiner

*Primary Examiner* — Michael L Leonard
*Assistant Examiner* — Jessica E Whiteley
(74) *Attorney, Agent, or Firm* — Oblon, Spivak, McClelland, Maier & Neustadt, L.L.P.

(57) ABSTRACT

An active ray curable composition, including: a photobase generator; a polymerizable compound; and an acid, wherein the photobase generator is a salt of a carboxylic acid and a basic compound, wherein a ratio by mole of a carboxyl group of the carboxylic acid:a basic functional group of the basic compound is 1:1, and wherein the acid is an acid that loses a function thereof as acid by light or heat.

9 Claims, No Drawings

ACTIVE RAY CURABLE COMPOSITION, ACTIVE RAY CURABLE INK COMPOSITION FOR INKJET PRINTING, ACTIVE RAY CURABLE ADHESIVE COMPOSITION, AND METHOD FOR STABILIZING ACTIVE RAY CURABLE COMPOSITION

BACKGROUND OF THE INVENTION

1. Field of the Invention

The present invention relates to an active ray curable composition, an active ray curable ink composition for inkjet printing, an active ray curable adhesive composition, and a method for stabilizing an active ray curable composition.

2. Description of the Related Art

Active ray curable compositions are favorably used in applications such as compositions for inkjet printing, adhesive compositions, and resist materials.

Typical one of such active ray curable compositions is a combination of a radical reactive compound and a photoradical initiator. In this reaction system, although the reaction speed is high, the radials are immediately deactivated by oxygen and the reaction is terminated, making it difficult to completely eliminate the residual monomer.

Also, a reaction system employing a cation reactive compound and a photoacid generator in combination is known as one of the reaction systems that are not inhibited by oxygen. In this reaction system, the acid serving as a reactive species is not immediately deactivated, and thus, the reaction continues to proceed even after termination of light irradiation, resulting in that the residual monomer can be reduced. However, in general, the acid serving as a reactive species is a strong acid, which may disadvantageously corrode or modify a substrate.

In addition, there are a few reaction systems employing an anion reactive compound and a photobase generator in combination (see, for example, Japanese Patent Application Laid-Open (JP-A) No. 2005-060520). In these reaction systems, the reaction proceeds even by a weak base and thus, unlike the case of the cation reactive compound, corrosion does not arise. However, the reaction speed is very low, which is problematic.

In the above-described reaction systems, the photoradical initiator, the photoacid generator or the photobase generator decomposes to form reaction-initiating species, which may allow the reaction to proceed. Thus, a radical scavenger may be used as a polymerization inhibitor, a base may be added to an acid, or an acid may be added to a base (see, for example, Japanese Patent (JP-B) No. 3299513, JP-A No. 2002-285107, JP-B No. 4208414 and JP-A Nos. 2001-302881 and 2005-194357). However, there is a problem that these compounds inhibit the reaction after light irradiation.

SUMMARY OF THE INVENTION

The present invention aims to solve the existing problems and improve an anionic curable active ray curable composition in storage stability without degradation in reactivity.

Means for solving the above existing problems are as follows.

That is, the present invention provides an active ray curable composition, including:
a photobase generator;
a polymerizable compound; and
an acid,
wherein the photobase generator is a salt of a carboxylic acid and a basic compound,
wherein a ratio by mole of a carboxyl group of the carboxylic acid:a basic functional group of the basic compound is 1:1, and
wherein the acid is an acid that loses a function thereof as acid by light or heat.

The present invention can solve the above existing problems and improve an anionic curable active ray curable composition in storage stability without degradation in reactivity.

DETAILED DESCRIPTION OF THE INVENTION (Active Ray Curable Composition)

An active ray curable composition of the present invention contains at least a photobase generator which is a salt of a carboxylic acid and a basic compound; a polymerizable compound; and an acid; and, if necessary, contains a photoradical polymerization initiator, other ingredients, or both thereof.

The acid is an acid that loses a function thereof as acid by light or heat. The photobase generator is a salt obtained by mixing a carboxylic acid and a basic compound together so that a ratio by mole of a carboxyl group of the carboxylic acid:a basic functional group of the basic compound is 1:1.

In the present invention, by adding an acid that loses a function thereof as acid by light or heat to an active ray curable composition containing a polymerizable compound and a photobase generator which is a salt of a carboxylic acid and a basic compound, a base forming before light irradiation is neutralized to prevent an anionic reaction (polymerization reaction) from proceeding.

<Acid>

The acid is not particularly limited and may be appropriately selected depending on the intended purpose so long as it is an acid that loses a function thereof as acid by light or heat. The acid is preferably a carboxylic acid that is decarboxylated and loses a function thereof as acid by active rays or heat. The acid that loses a function thereof as acid by heat may be acids that lose a function thereof as acid at a temperature of 200° C. or higher, for example. These may be used alone or in combination.

Examples of the acid that loses a function thereof as acid by light or heat include compounds represented by the following General Formulas (A) and (B).

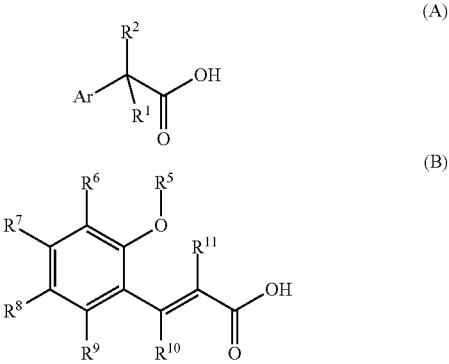

In General Formulas (A) and (B), Ar represents an aromatic ring which may have a substituent. The substituent is not particularly limited and may be appropriately selected depending on the intended purpose. Examples thereof include a benzoyl group, a nitro group, an alkyl group and an alkoxy group. The substituent may form a ring. $R^1$ to $R^{11}$ each independently represent a hydrogen atom, an alkyl group, an alkoxy group, a hydroxyl group or an aryl group.

Among compounds represented by General Formulas (A) and (B), compounds represented by General Formula (A) are preferred since they have a photosensitive wavelength in the ultraviolet region and exhibit good reaction-initiating efficiency with a basic compound. Among them, compounds represented by the following General Formulas (C) and (C') are more preferred.

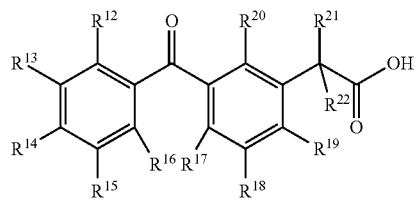

(C)

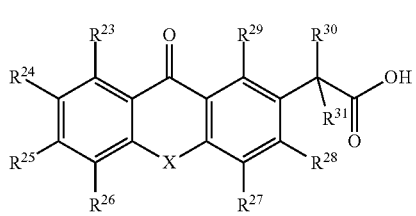

(C')

In General Formulas (C) and (C'), $R^{12}$ to $R^{31}$ each independently represent a hydrogen atom, an alkyl group which may have a substituent, an alkoxy group which may have a substituent, a hydroxyl group, a halogen atom or a cyano group, and X represents an oxygen atom, a sulfur atom, a carbon atom or a carbonyl group.

Specific examples of the acid that loses a function thereof as acid by light or heat include the following compounds.

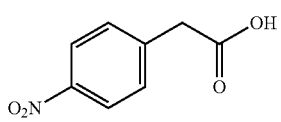

(A-1)

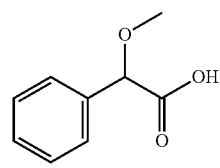

(A-2)

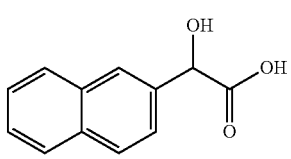

(A-3)

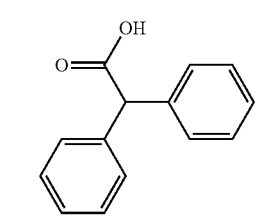

(A-4)

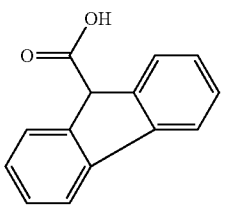

(A-5)

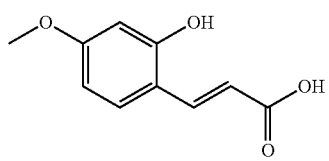

(B-1)

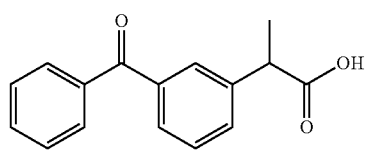

(C-1)

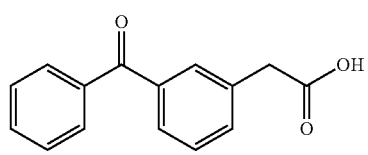

(C-2)

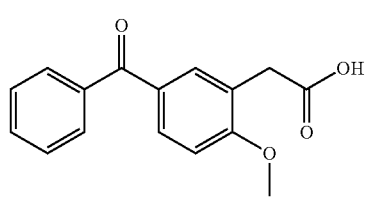

(C-3)

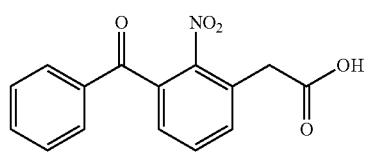

(C-4)

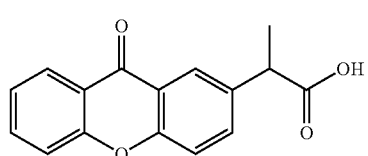

(C-5)

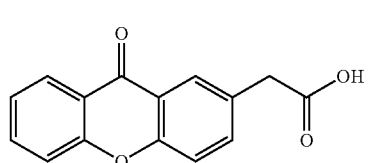

(C-6)

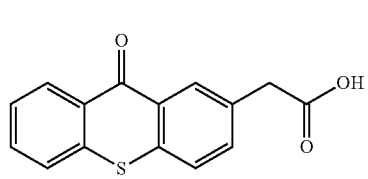

(C-7)

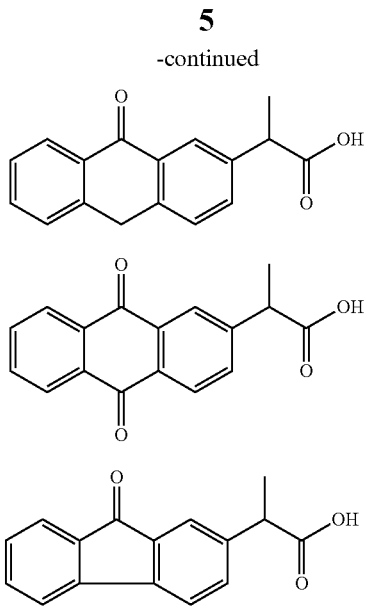

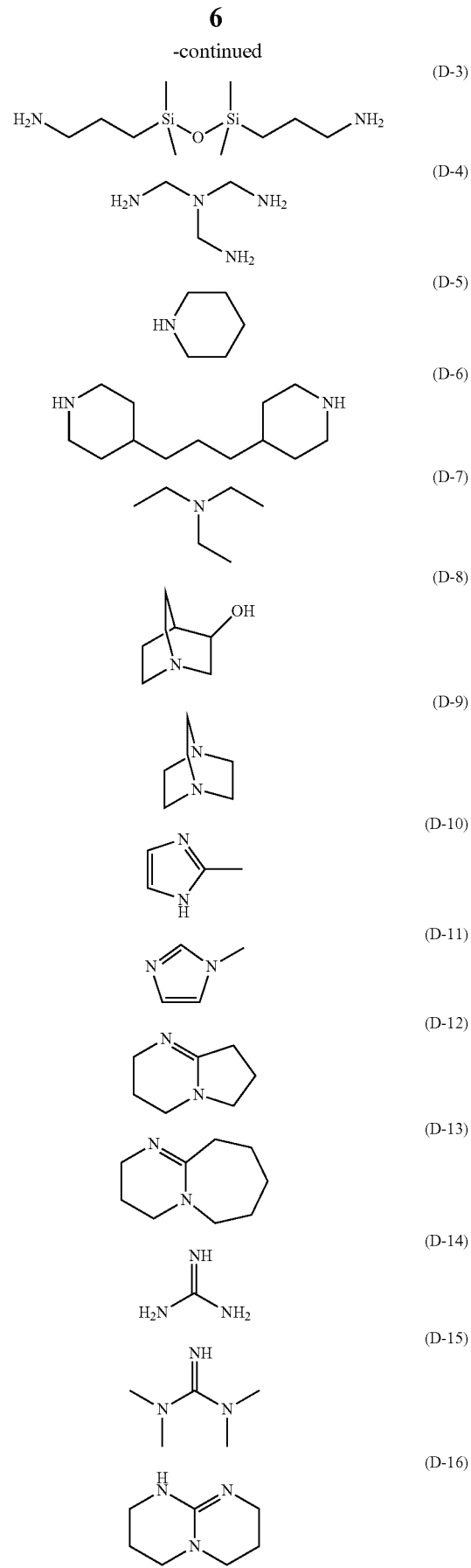

In the present invention, the amount of the acid added to the active ray curable composition is preferably 50% by mass to 100% by mass relative to the amount of the photobase generator. When the amount of the acid falls within this range, it is possible to provide an active ray curable composition which maintains stability and involves no change in viscosity even after storage.

<Photobase Generator>

The photobase generator is a salt of a carboxylic acid and a basic compound, where a ratio by mole of a carboxyl group of the carboxylic acid:a basic functional group of the basic compound is 1:1. The photobase generator may generate a base and a radical at the same time.

<<Carboxylic Acid>>

The carboxylic acid is not particularly limited and may be appropriately selected depending on the intended purpose so long as it is a compound containing at least one carboxyl group. The carboxylic acids exemplified as the acid can preferably be used. These may be used alone or in combination. When the carboxylic acids exemplified as the acid are decarboxylated by active rays or heat, they lose a function thereof as acid upon curing through polymerization reaction, not preventing the anionic polymerization reaction from proceeding. The carboxylic acid and the acid may be the same compound or different from each other.

<<Basic Compound>>

The basic compound is not particularly limited and may be appropriately selected depending on the intended purpose. Preferred examples thereof include amine derivatives, amidine derivatives, guanidine derivatives and polyphosphazene derivatives. These may be used alone or in combination. Specific examples thereof include the following compounds.

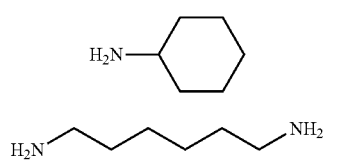

(D-17)
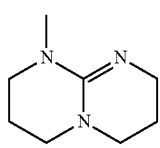

(D-18)
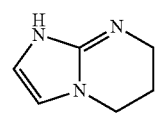

(D-19)
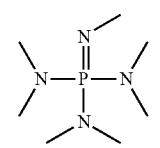

(D-20)
KOH

<Polymerizable Compound>

The polymerizable compound is not particularly limited and may be appropriately selected depending on the intended purpose so long as it is a compound that initiates polymerization reaction by a base generated from the photobase generator. In the present invention, since an acid that loses a function thereof as acid by light or heat is added, the polymerizable compound is preferably compounds that do not initiate polymerization reaction by an acid. These may be used alone or in combination.

The photobase generator encompasses a photobase generator that generates a base and a radical at the same time. When such a photobase generator is used, the polymerizable compound is preferably a polymerizable compound that initiates polymerization reaction by both a base and a radial. Among them, (meth)acrylates and acrylamides are more preferred. Specific examples thereof include the following compounds.

(E-1)
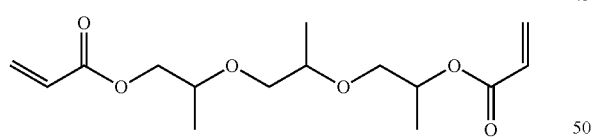

(E-2)
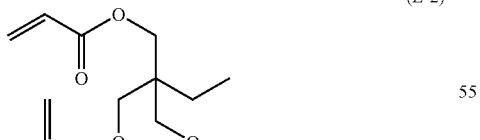

(E-3)
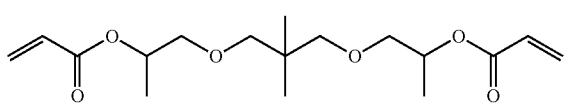

(E-4)
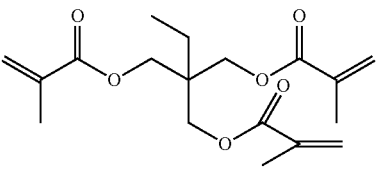

(E-5)
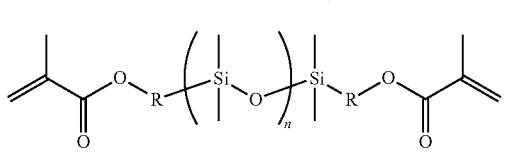

(E-6)
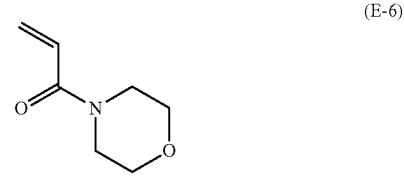

(E-7)
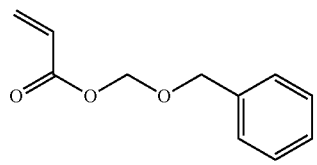

(E-8)
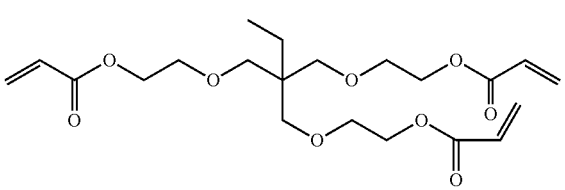

(E-9)
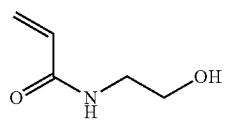

(E-10)
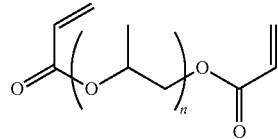

n = 12

(E-11)
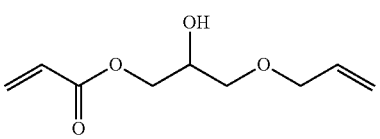

<Photoradical Polymerization Initiator>

When the photoradical polymerization initiator is used in combination with a polymerizable compound that initiates polymerization reaction by both a base and a radial, the active ray curable composition is increased in curing speed.

The photoradical polymerization initiator is not particularly limited and may be appropriately selected depending on the intended purpose. Preferred examples thereof include benzophenones, alkylphenones, acylphosphineoxides, oxyphenyl acetic acid esters, benzoin ethers, oxime esters and thioxanthones. These may be used alone or in combination.

Specific examples thereof include the following compounds.

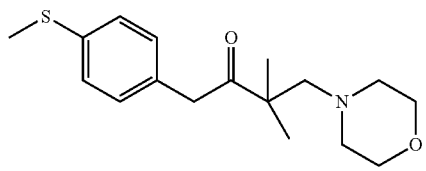
(F-1)

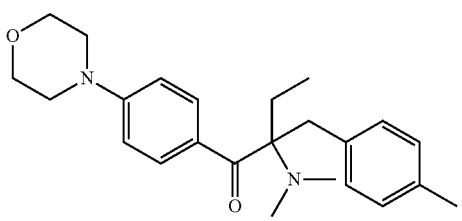
(F-2)

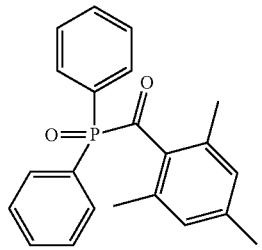
(F-3)

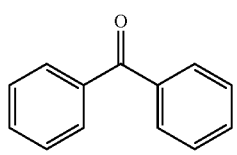
(F-4)

<Other Ingredients>

The other ingredients are not particularly limited and may be appropriately selected depending on the intended purpose. Examples thereof include a colorant, an additive and a solvent. These may be used alone or in combination.

The additive is not particularly limited and may be appropriately selected for making improvements in storage stability and other properties.

The solvent is not particularly limited and may be appropriately selected depending on the intended purposes such as adjustment in viscosity.

The colorant is not particularly limited and may be appropriately selected depending on the intended purpose. Examples thereof include various known dyes and pigments. These may be used alone or in combination. Among them, colorants excellent in light stability and color reproducibility are preferred. Also, preferred are colorants which give no adverse effects on the curing reaction and which do not function as a polymerization inhibitor.

When a pigment is used, a dispersing agent may optionally be used together.

The dispersing agent is not particularly limited and may be appropriately selected depending on the intended purpose.

The active rays usable for curing the active ray curable composition of the present invention are not particularly limited and may be appropriately selected depending on the sensitive wavelength of the photobase generator and sensitizer, but UV rays are preferred. Examples of light sources of UV rays include mercury lamps, metal halide lamps, xenon lamps and LEDs.

Applications of the active ray curable composition of the present invention are not particularly limited and may be appropriately selected so long as they are fields where light-curable materials are generally used. The active ray curable composition of the present invention can be used as, for example, an active ray curable ink composition for inkjet printing or an active ray curable adhesive composition.

EXAMPLES

The present invention will next be described by way of Examples, which should not be construed as limiting the present invention thereto. In the following description, the unit "part(s)" means "part(s) by mass."

Examples 1 to 11 and Comparative Examples 1 to 8

Ink compositions were prepared using materials in accordance with formulations presented in Table 1. Note that, symbols representing each compound in Table 1 are the same as those of the above-exemplified compounds.

Some of the reaction initiators in Table 1 contain a photobase generator alone, others contain both a photobase generator and a photoradical polymerization initiator. The photobase generator was prepared so that a ratio by mole of a carboxyl group of the carboxylic acid a basic functional group of the basic compound was 1:1. When both of the photobase generator and the photoradical polymerization initiator are used, the photobase generator obtained in the above-described manner and the photoradical polymerization initiator were used in the corresponding parts per 100 parts of the polymerizable compound.

Each active ray curable composition was prepared in the following manner. First, carboxylic acid A-1, C-1 or C-5 was mixed with basic compound D-14 or D-16 in equal amount by mole (1:1) to thereby produce a photobase generator. Then, as presented in Table 1, a polymerizable compound, an acid that loses a function thereof as acid by light or heat, a pigment were added to and mixed with the photobase generator. Note that, when a pigment was added, the pigment and the polymerizable compound were mixed together in advance for use.

The pigment used was the following.
CB: BASF Japan Ltd., MICROLITH Black C-K (carbon black pigment)
Blue: BASF Japan Ltd., MICROLITH Blue 4G-K
[Evaluation]

Each of the active ray curable compositions of Examples 1 to 11 and Comparative Examples 1 to 8 was evaluated for storage stability. As for the storage stability, evaluation was made on properties of the composition after each of heating tests *1 to *5, which are described in detail below Table 1. The evaluation results are presented in Table 1.

TABLE 1

| | Polymerizable compound | | Reaction initiator | | Acid | | Pigment | | Storage conditions | Viscosity after storage |
|---|---|---|---|---|---|---|---|---|---|---|
| | Type | Parts | Type | Parts | Type | Parts | Type | Parts | | |
| Ex. 1 | E-6<br>E-7<br>E-8 | 32<br>30<br>38 | C-1<br>D-16 | 10 | C-1 | 5 | — | | *1 | Not-solidified |
| Ex. 2 | E-6<br>E-7<br>E-8 | 32<br>30<br>38 | C-1<br>D-16 | 10 | C-1 | 5 | CB | 3 | *1 | Not-solidified |
| Ex. 3 | E-6<br>E-7<br>E-8 | 32<br>30<br>38 | C-1<br>D-16 | 10 | C-1 | 5 | Blue | 3 | *1 | Not-solidified |
| Comp. Ex. 1 | E-6<br>E-7<br>E-8 | 32<br>30<br>38 | C-1<br>D-16 | 10 | — | | — | | *1 | Solidified |
| Ex. 4 | E-11 | 100 | C-1<br>D-16 | 10 | C-1 | 10 | — | | *2 | Not-solidified |
| Comp. Ex. 2 | E-11 | 100 | C-1<br>D-16 | 10 | — | | — | | *2 | Solidified |
| Ex. 5 | E-11 | 100 | C-1<br>D-16 | 10 | A-1 | 10 | — | | *2 | Not-solidified |
| Ex. 6 | E-11 | 100 | C-5<br>D-16 | 10 | C-1 | 10 | — | | *2 | Not-solidified |
| Comp. Ex. 3 | E-11 | 100 | C-5<br>D-16 | 10 | — | | — | | *2 | Solidified |
| Ex. 7 | E-1 | 100 | C-5<br>D-16 | 10 | C-1 | 10 | — | | *3 | Not-solidified |
| Comp. Ex. 4 | E-1 | 100 | C-5<br>D-16 | 10 | — | | — | | *3 | Solidified |
| Ex. 8 | E-1 | 100 | C-1<br>D-16<br>F-2 | 5<br><br>5 | A-1 | 10 | — | | *3 | Not-solidified |
| Comp. Ex. 5 | E-1 | 100 | C-1<br>D-16<br>F-2 | 5<br><br>5 | — | | — | | *3 | Solidified |
| Ex. 9 | E-1 | 100 | C-1<br>D-16 | 5 | A-1 | 10 | — | | *3 | Not-solidified |
| Comp. Ex. 6 | E-1 | 100 | C-1<br>D-16 | 5 | — | | — | | *3 | Solidified |
| Ex. 10 | E-1 | 100 | A-1<br>D-16 | 10 | C-1 | 10 | — | | *4 | Not-solidified |
| Comp. Ex. 7 | E-1 | 100 | A-1<br>D-16 | 10 | — | | — | | *4 | Solidified |
| Ex. 11 | E-6 | 100 | C-1<br>D-14 | 10 | C-1 | 10 | — | | *5 | Not-solidified |
| Comp. Ex. 8 | E-6 | 100 | C-1<br>D-14 | 10 | — | | — | | *5 | Solidified |

Note that, *1 to *5 in Storage conditions in Table 1 mean the following conditions.
*1: 100° C. for 7 days
*2: 120° C. for 8 days
*3: 120° C. for 1 day
*4: 100° C. for 1 day
*5: 90° C. for 1 hour As is clear from Table 1, it was found that by adding an acid that loses a function thereof as acid by light or heat to an active ray curable composition containing a polymerizable compound and a photobase generator, the active ray curable composition was not solidified even after the heating test and was excellent in storage stability.

The active ray curable compositions of Example 1 and Comparative Example 1 were irradiated with light using the following light irradiation device, and were compared with each other in terms of curability through measurement of viscoelasticity. Energy doses required for curing the active ray curable compositions were almost the same; i.e., 64 mJ/cm² and 63 mJ/cm². This is likely because the acid added to the active ray curable composition was decarboxylated and lost its function as acid by active rays applied upon curing, and thus did not adversely affect curing (polymerization reaction).

In addition, the active ray curable compositions of Example 9 and Comparative Example 6 were compared with each other in terms of curability in the same manner. As a result, energy doses required for curing the active ray curable compositions were almost the same; i.e., 506 mJ/cm² and 501 mJ/cm².

Furthermore, the active ray curable compositions of Example 1 and Comparative Example 1 were measured at 180° C. for energy doses required for curing the active ray curable compositions, and as a result the energy doses were almost the same; i.e., 35 mJ/cm² and 34 mJ/cm². This is likely because the acid added to the active ray curable composition was decarboxylated and lost its function as acid by heat, and thus did not adversely affect curing (polymerization reaction).

Device: VAR-200AD, product of Reologica Instruments, Co., Ltd., light source: high-pressure Hg lamp at 25 mW/cm², light irradiation was performed after 5 sec The active ray curable composition of the present invention can suitably used as, for example, an active ray curable ink composition for inkjet printing or an active ray curable adhesive composition.

Aspects of the present invention are, for example, as follows.

<1> An active ray curable composition, including:
a photobase generator;
a polymerizable compound; and
an acid,
wherein the photobase generator is a salt of a carboxylic acid and a basic compound,
wherein a ratio by mole of a carboxyl group of the carboxylic acid a basic functional group of the basic compound is 1:1, and
wherein the acid is an acid that loses a function thereof as acid by light or heat.

<2> The active ray curable composition according to <1>, wherein the acid is a carboxylic acid that is decarboxylated by light or heat.

<3> The active ray curable composition according to <2>, wherein the carboxylic acid is represented by the following General Formula (I) or (II):

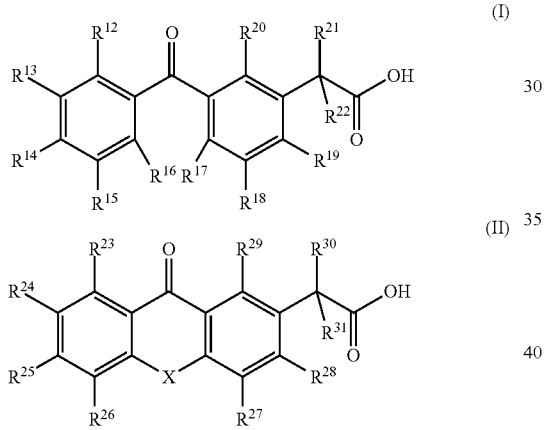

where $R^{12}$ to $R^{31}$ each independently represent a hydrogen atom, an alkyl group which may have a substituent, an alkoxy group which may have a substituent, a hydroxyl group, a halogen atom or a cyano group, and X represents an oxygen atom, a sulfur atom, a carbon atom or a carbonyl group.

<4> The active ray curable composition according to any one of <1> to <3>,
wherein the basic compound is an amine derivative, an amidine derivative, a guanidine derivative, a polyphosphazene derivative, or any combination thereof.

<5> The active ray curable composition according to any one of <1> to <4>,
wherein the polymerizable compound is (meth)acrylate, acrylamide, or both thereof.

<6> The active ray curable composition according to any one of <1> to <5>, further including a photoradical polymerization initiator.

<7> An active ray curable ink composition for inkjet printing, including:
an active ray curable composition,
wherein the active ray curable composition is the active ray curable composition according to any one of <1> to <6>.

<8> An active ray curable adhesive composition, including:
an active ray curable composition,
wherein the active ray curable composition is the active ray curable composition according to any one of <1> to <6>.

<9> A method for stabilizing an active ray curable composition, the method including:
adding an acid to an active ray curable composition,
wherein the active ray curable composition contains a photobase generator and a polymerizable compound,
wherein the photobase generator is a salt of a carboxylic acid and a basic compound,
wherein a ratio by mole of a carboxyl group of the carboxylic acid a basic functional group of the basic compound is 1:1, and
wherein the acid is an acid that loses a function thereof as acid by light or heat.

This application claims priority to Japanese application No. 2012-086047, filed on Apr. 5, 2012 and incorporated herein by reference.

What is claimed is:

1. An active ray curable composition, comprising:
a photobase generator;
a polymerizable compound; and
an acid,
wherein the photobase generator is a salt of a carboxylic acid and a basic compound,
wherein a ratio by mole of a carboxyl group of the carboxylic acid:a basic functional group of the basic compound is 1:1,
wherein the acid is an acid that loses a function thereof as acid by light or heat, and
wherein an amount of the acid is 50% by mass to 100% by mass relative to an amount of the photobase generator.

2. The active ray curable composition according to claim 1, wherein the acid is a carboxylic acid that is decarboxylated by light or heat.

3. The active ray curable composition according to claim 2, wherein the carboxylic acid is represented by the following General Formula (I) or (II).

4. The active ray curable composition according to claim 1, wherein the basic compound is an amine derivative, an amidine derivative, a guanidine derivative, a polyphosphazene derivative, or any combination thereof.

5. The active ray curable composition according to claim 1, wherein the polymerizable compound is (meth)acrylate, acrylamide, or both thereof.

6. The active ray curable composition according to claim 1, further comprising a photoradical polymerization initiator.

7. An active ray curable ink composition for inkjet printing, comprising:
an active ray curable composition as claimed in claim 1

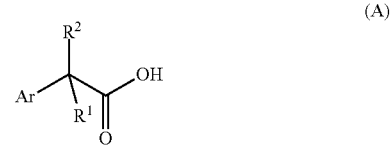

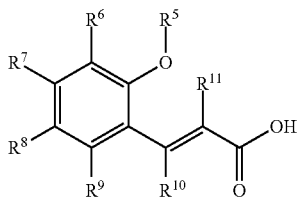

(B)

wherein Ar represents an aromatic ring which may have a substituent; and $R^1$ to $R^{11}$ each, independently, represent a hydrogen atom, an alkyl group, an alkoxy group, a hydroxyl group or an aryl group.

8. An active ray curable adhesive composition, comprising: an active ray curable composition as claimed in claim 1.

9. The active ray curable composition according to claim 1, wherein the acid that loses a function thereof as acid by light or heat comprises one or more compounds represented by Formulas (A) and (B):

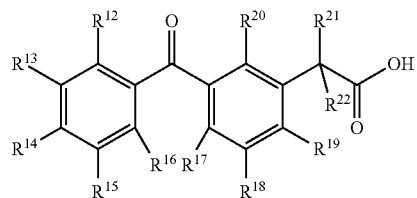

(I)

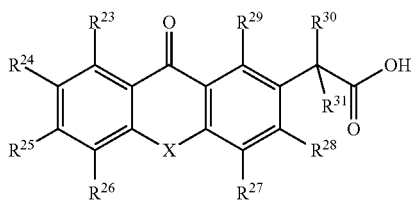

(II)

where $R^{12}$ to $R^{31}$ each independently represent a hydrogen atom, an alkyl group which may have a substituent, an alkoxy group which may have a substituent, a hydroxyl group, a halogen atom or a cyano group, and X represents an oxygen atom, a sulfur atom, a carbon atom or a carbonyl group.

* * * * *